United States Patent
Takase

(10) Patent No.: US 10,888,910 B2
(45) Date of Patent: Jan. 12, 2021

(54) MACHINING METHOD FOR BURRED FLAT HOLES IN METAL PLATES

(71) Applicant: T.RAD Co., Ltd., Tokyo (JP)

(72) Inventor: Masaaki Takase, Tokyo (JP)

(73) Assignee: T.RAD CO., LTD., Tokyo (JP)

( * ) Notice: Subject to any disclaimer, the term of this patent is extended or adjusted under 35 U.S.C. 154(b) by 100 days.

(21) Appl. No.: 16/466,558

(22) PCT Filed: Dec. 20, 2017

(86) PCT No.: PCT/JP2017/047147
§ 371 (c)(1),
(2) Date: Jun. 4, 2019

(87) PCT Pub. No.: WO2018/124255
PCT Pub. Date: Jul. 5, 2018

(65) Prior Publication Data
US 2019/0351471 A1 Nov. 21, 2019

(30) Foreign Application Priority Data
Dec. 26, 2016 (JP) ................................ 2016-250563

(51) Int. Cl.
*B21D 19/08* (2006.01)
*B21D 53/04* (2006.01)
*B23P 15/26* (2006.01)
*F28F 9/04* (2006.01)

(52) U.S. Cl.
CPC ........... *B21D 19/08* (2013.01); *B21D 19/088* (2013.01); *B21D 53/04* (2013.01); *B23P 15/26* (2013.01); *F28F 9/04* (2013.01); *Y10T 29/49389* (2015.01)

(58) Field of Classification Search
CPC ...... B21D 53/04; B21D 19/08; B21D 19/088; F28F 9/04; B23P 15/26; Y10T 29/49389
See application file for complete search history.

(56) References Cited

U.S. PATENT DOCUMENTS

| | | | | |
|---|---|---|---|---|
| 4,044,443 A | * | 8/1977 | Chartet | F16L 41/001 29/890.043 |
| 4,234,041 A | * | 11/1980 | Melnyk | F28F 9/02 165/173 |
| 5,088,193 A | * | 2/1992 | Okada | B21D 53/02 29/890.043 |
| 6,446,337 B1 | * | 9/2002 | Halm | F28F 9/182 29/527.2 |

(Continued)

FOREIGN PATENT DOCUMENTS

| | | |
|---|---|---|
| JP | 8-267147 A | 10/1996 |
| JP | 2004-202549 A | 7/2004 |
| JP | 3822958 B2 | 9/2006 |

*Primary Examiner* — Jason L Vaughan
(74) *Attorney, Agent, or Firm* — Norris McLaughlin, P.A.

(57) ABSTRACT

A machining method for a burred flat hole includes first an overhang portion is formed in a flat hole-forming region in a metal plate in a first step, subsequently a flat hole portion is formed in the overhang portion in a second step, and finally burring is formed on the peripheral edge portion of the hole portion in a third step. Accordingly, when burring is to be formed, overhanging machining and perforating machining have been substantially completed, and therefore pressing force of a punch for burring machining can be set to the minimum value necessary for burring formation.

2 Claims, 4 Drawing Sheets

(56) References Cited

U.S. PATENT DOCUMENTS

| | | | | |
|---|---|---|---|---|
| 6,651,333 | B2* | 11/2003 | Letrange | F28F 9/02 |
| | | | | 29/890.052 |
| 6,928,849 | B1 | 8/2005 | Yamada | |
| 8,935,854 | B2* | 1/2015 | Hirayama | F28F 9/0278 |
| | | | | 29/890.03 |
| 9,566,672 | B2* | 2/2017 | Kim | F28F 1/30 |
| 2006/0218791 | A1* | 10/2006 | Lamkin | B21D 19/08 |
| | | | | 29/890.052 |
| 2014/0158333 | A1 | 6/2014 | Kim et al. | |

* cited by examiner

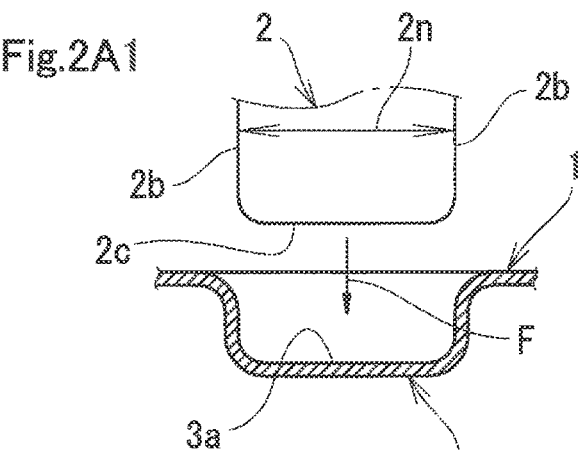
Fig.2A1
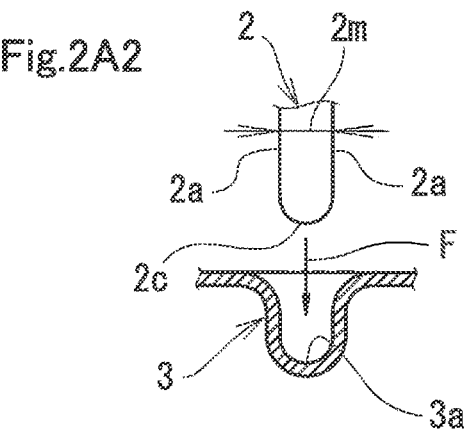
Fig.2A2
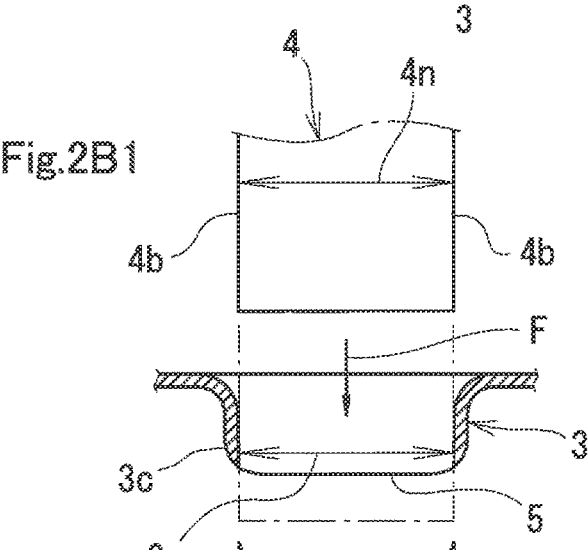
Fig.2B1
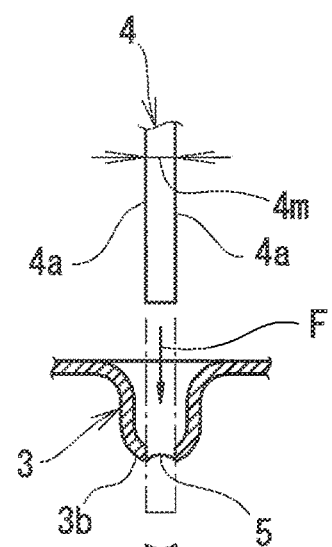
Fig.2B2
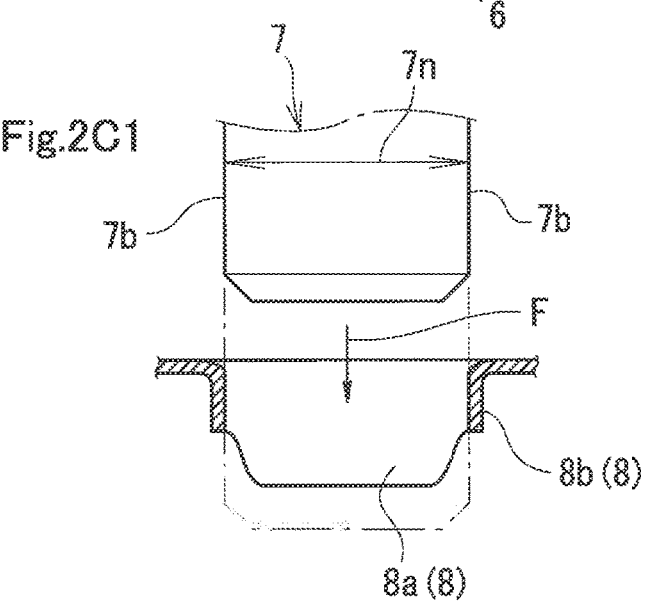
Fig.2C1
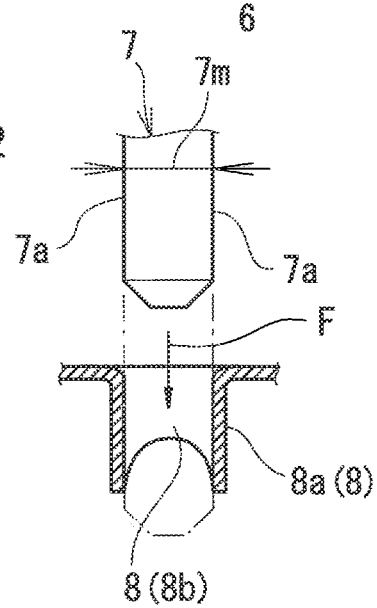
Fig.2C2

US 10,888,910 B2

MACHINING METHOD FOR BURRED FLAT HOLES IN METAL PLATES

TECHNICAL FIELD

The present invention relates to a method for machining a burred flat hole in metal plates such as a header plate for a heat exchanger in vehicles and the like.

BACKGROUND ART

Common heat exchangers are configured by providing a core portion between an inlet side tank and an outlet side tank for fluid such as cooling water. The core portion has stacked plural flat tubes and plural fins arranged therebetween, and both end portions of each flat tube are brazed and fixed in a state of being inserted in burred flat holes formed on a header plate of each tank. Usually, a header plate, flat tube and fin are produced by machining a metal plate such as an aluminum material.

A flat hole in a header plate is usually formed by press machining. Specifically, one of surfaces of a metal plate is arranged from above so as to contact a surface of a die (fundamental tool) in which a flat cavity portion has been formed, and in this state an apical portion of a flat punch (punch tool) for burring machining is pressed toward the cavity portion from the other surface of the metal plate, to machine a burred flat hole in the metal plate.

However, when a burred flat hole is to be machined by a press machining, comparatively large stress is generated at both apical portions in a major axis direction where the curvature radius of the flat hole is small, and therefore local damage such as crack may be created with high probability in a burred portion at the apical portion. FIG. 6 shows an example in which such a crack phenomenon is generated. In the example in FIG. 6, a burring 8 having identical height is formed on the entire peripheral edge of a flat hole 9 formed by press machining in a metal plate 1, and a crack portion 14 is brought about at one of apical portions on the major axis side thereof. When the crack portion 14 like this is generated, brazing quality between parts is not stabilized, and durability performance of a product is also not stabilized. Furthermore, inferior phenomena such as leakage of fluid from the portion may be brought about.

In Patent Literature 1, a method for solving the above-described problem is disclosed.

In this method of burring machining, at both end portions in the longitudinal direction of a region in a metal plate in which a flat hole is formed, prepared holes with a diameter smaller than thickness (wall thickness) of a flat tube are formed respectively in advance. Each prepared hole is punched with a punch for forming a small hole. Next, a part sandwiched by both prepared holes is subjected to press machining with a punch for burring machining to machine a burred flat hole. Then a rim portion of a tank main body is fixed to both end portions of a header plate that is a metal plate to form a tank and an apical portion of a flat tube is inserted in a flat hole on which burring has been formed.

According to the method in Patent Literature 1, the metal in the portion of the metal plate, in which the prepared hole has been formed, has been removed in advance, and therefore, when press machining is performed, height of burring to be formed at both end portions in the major axis direction of the flat hole is to be formed slightly lower than other burring portions in accordance with the removed metal amount. Therefore, it is expected that stress to be brought about in the portion upon press machining decreases to some extent in accordance with it, and that the crack phenomenon as shown in FIG. 6 is also avoided.

CITATION LIST

Patent Literature

PTL 1: Japanese patent No. 3822958

SUMMARY OF INVENTION

Technical Problem

However, in the method in Patent Literature 1, the diameter of the prepared hole is limited to a range smaller than thickness of the flat tube, and therefore, in a case where length in a major axis direction of a flat hole into which a flat tube is to be inserted is large, or in a case where height of burring is set to be high, difference between height of burring on side portions parallel to the major axis direction of the flat hole and height of burring at both end portions in the major axis direction of the flat hole becomes a little. Therefore, there is limit on the effect of avoiding crack at both end portions of the flat hole.

Consequently, the present invention provides a new machining method for burred flat holes that has solved problems in such a conventional method for avoiding crack.

Solution to Problem

A first invention of the present inventions is a machining method for a burred flat hole in a metal plate, including:

a first step of pressing an overhanging punch 2 having a flat cross-section orthogonal to a pressing direction onto a surface of a metal plate 1 to form an overhang portion 3 that is flat in the cross-section;

a second step of pressing a perforating punch 4 having a flat cross-section orthogonal to the pressing direction onto a bottom surface 3a of the formed overhang portion 3 to form a planar flat hole portion 5 in the portion; and a third step of pressing a burring punch 7 onto a peripheral edge portion of the formed hole portion 5 to form a burring 8 by pulling up the portion, wherein:

each of the overhanging punch 2 and the perforating punch 4 has a pair of side surfaces 2a, 4a that are parallel to the pressing direction and are positioned at both ends in a longitudinal direction (hereinafter, referred to as a "major axis direction") of the cross-section and a pair of side surfaces 2b, 4b that are positioned at both ends in a width direction (hereinafter, referred to as a "minor axis direction") of the cross-section; and difference $7n-2n$ between the side surface gap $7n$ at both ends in the major axis direction of the cross-section of the burring punch 7 and the side surface gap $2n$ at both ends in the major axis direction of the cross-section of the overhanging punch 2 is set to be smaller than difference $7m-2m$ between the side surface gap $7m$ at both ends in the minor axis direction of the cross-section of the burring punch 7 and the side surface gap $2m$ in the minor axis direction of the cross-section of the overhanging punch 2, that is, $7n-2n<7m-2m$ (claim 1).

A second invention of the present inventions is that, in the first invention, the metal plate 1 is a header plate 10 for a heat exchanger (claim 2).

Advantageous Effects of Invention

In the first invention, as above, first an overhang portion is formed in a flat hole-forming region in a metal plate in the first step, subsequently a flat hole portion is formed in the overhang portion in the second step, and finally burring is formed on the peripheral edge portion of the hole portion in the third step. Accordingly, when burring is to be formed, overhanging machining and perforating machining have been substantially completed, and therefore pressing force of a punch for burring machining can be set to the minimum value necessary for burring formation. Therefore, when the method is compared with a conventional method in which overhang portion formation, hole portion formation and burring formation are simultaneously performed with the same punch, stress generated in the portion when burring is to be formed is remarkably reduced.

Furthermore, in the first invention, the difference between the side surface gap in the major axis direction of a horizontal cross-section orthogonal to the pressing direction of a burring punch and the side surface gap in the major axis direction of a horizontal cross-section of an overhanging punch is set to be smaller than the difference between the side surface gap in the minor axis direction of a burring punch and the side surface gap in the minor axis direction of an overhanging punch. Consequently, upon burring machining, low burring is formed while rim portions of a hole portion in the major axis direction having small gap difference expands in a smaller extent, and high burring is formed while rim portions of the hole portion in the minor axis direction (width direction) having large gap difference expands in a larger extent. Therefore, upon burring formation, the stress to be generated at rim portions in the major axis direction of the hole portion is also reduced accordingly.

As a result, in the first invention, a synergistic effect of two reductions, that is, the reduction in the stress in the overhanging and perforating steps by the first step and the second step and the reduction in stress generated in burring at rim portions in the major axis direction by the third step, is obtained to remarkably improve flexibility of the dimension of a flat hole and height of burring. Therefore, even in a case where a large flat hole is to be formed or high burring is to be formed, a burred flat hole can be formed easily and surely without causing a crack phenomenon in the burred portion.

Accordingly, as above, regardless of the size of flat holes or the burring height around the peripheral edge portion thereof, highly flexible, widely applicable and simple burred flat holes can be machined.

The above-described second invention exhibits excellent effects in durability and the like when it is utilized for a header plate of a heat exchanger for vehicles particularly in a state of critical circumstances.

BRIEF DESCRIPTION OF DRAWINGS

FIG. 2 illustrates a partial cross-section view explaining a machining method by three steps in the present invention.

DESCRIPTION OF EMBODIMENTS

Figure 1A:
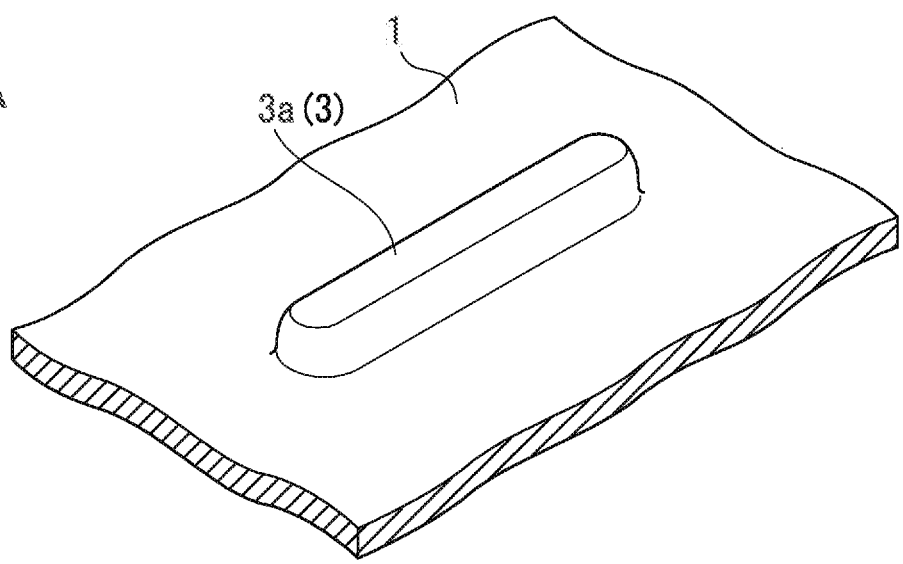
FIG. 1 illustrates a partial perspective view showing respective shapes of a metal plate formed by three steps in the present invention.
Figure 1B:
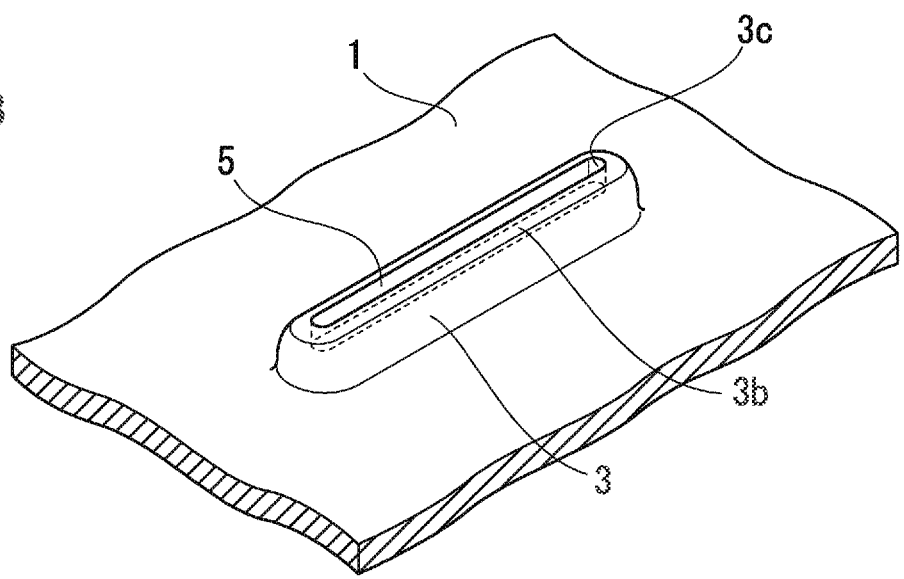
Figure 1C:
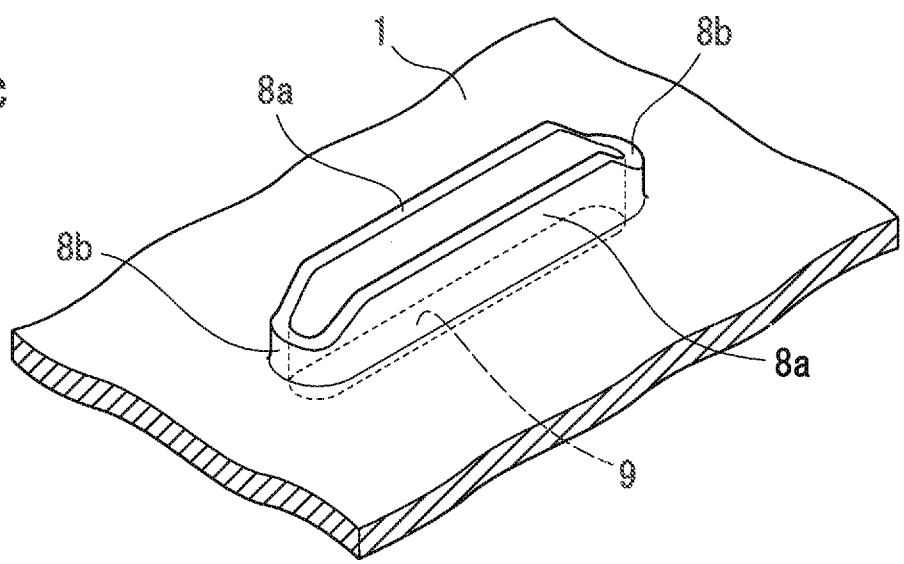

Next, on the basis of the drawings, embodiments of the present invention will be explained. FIG. 1 illustrates a partial perspective view showing respective shapes of a metal plate formed by three steps that are characteristics of a machining method of the present invention. That is, FIG. 1(A) shows a shape of a metal plate machined in a first step, FIG. 1(B) shows a shape of the metal plate machined in a second step, and FIG. 1(C) shows a shape of the metal plate machined in a third step. Meanwhile, respective views in FIG. 1 are views seen from a rear surface side (surface on a inverse direction side relative to a pressing direction of a punch) of the metal plate.

FIG. 2 illustrates partial cross-section views for explaining a machining method by three steps in the present invention, in which FIGS. 2(A1) and 2(A2) show the first step, FIGS. 2(B1) and 2(B2) show the second step, and FIGS. 2(C1) and 2(C2) show the third step. In these drawings, (A1), (B1) and (C1) are cross-section views of a cross-section parallel to a pressing direction F of respective overhanging punch 2, perforating punch 4 and burring punch 7 and a cross-section on the major axis of a cross-section orthogonal to the pressing direction F. (A2), (B2) and (C2) are cross-section views of a cross-section parallel to the pressing direction F of respective overhanging punch 2, perforating punch 4 and burring punch 7 and a cross-section seen on a minor axis of a cross-section orthogonal to the pressing direction F. Here, a major axis includes one whose cross-section orthogonal to the pressing direction F is flat ellipsoid shape (note that the ellipsoid shape is a race track shape (including a pair of parallel portions facing each other and a pair of arc portions linking both ends thereof)), and means the major axis of the ellipsoid. A minor axis means the minor axis of the ellipsoid.

FIGS. 2(A1) and 2(A2) in the first step show a state in which the overhanging punch 2, in which a horizontal cross-section orthogonal to the pressing direction F thereof is a flat ellipsoid, is pressed in the pressing direction F shown by an arrow onto a metal plate 1 to form an overhang portion 3 having a horizontal cross-section of ellipsoid in the metal plate 1. The flat overhanging punch 2 having an ellipsoidal horizontal cross-section has a pair of side surfaces 2b positioned at both ends in a major axis direction of an ellipsoidal horizontal cross-section and a pair of side surfaces 2a positioned at both ends in a minor axis direction, which are made of a hard metal for press and extend parallel to the pressing direction F. Meanwhile, in order to form this overhang portion 3, it is sufficient to place a metal plate on a not illustrated die in which a concave portion larger than the outer circumference of the overhang portion 3, and then to press the overhanging punch 2 into the die.

In the above-described overhanging punch 2, the apical portion (bottom portion 3a) in the pressing direction F shown in FIG. 2(A1) is flat, small arc portions are formed at both end portions in the major axis direction of the bottom portion, and the apical portion (bottom portion 3a) in the minor axis direction is formed in an arc shape as a whole, as shown in FIG. 2(A2). In other words, the major axis direction of the ellipsoid of the bottom portion 3a of the overhang portion 3 formed in the metal plate 1 is substantially flat, and the minor axis direction of the ellipsoid of the bottom portion 3a is formed in an arc shape. Meanwhile, the pressing force of the overhanging punch 2 is set within a range necessary for forming the overhang portion 3 in the metal plate 1. The shape of the overhang portion 3 formed in the first step is shown in FIG. 1(A).

FIGS. 2(B1) and 2(B2) of the second step show a state where the perforating punch 4 having a flat ellipsoidal cross-section is pressed in the pressing direction F shown by an arrow onto the bottom surface 3a of the overhang portion 3 formed in the first step to form a flat ellipsoidal hole portion 5 in the portion. The perforating punch 4, whose horizontal cross-section orthogonal to the pressing direction is a flat ellipsoid, has a pair of side surfaces 4b positioned at both ends in the major axis direction of the ellipsoid and a pair of side surfaces 4a at both end positions in the minor axis direction of the ellipsoid orthogonal to these, which are made of a hard metal for press and extend parallel to the pressing direction. This perforating step can be performed by arranging a not illustrated die for the outer circumference of the overhang portion 3 except for a perforating portion.

In the perforating punch 4, as shown in FIGS. 2(B1) and 2(B2), the apical portion (bottom portion) in the pressing direction F is formed evenly. Meanwhile, the pressing force of the perforating punch 4 is set within a range necessary for forming the hole portion 5 in the metal plate 1.

In the present embodiment, a side surface gap 4n of a pair of side surfaces 4b at both ends in the major axis direction of the horizontal cross-section in the perforating punch 4 is substantially identical to the side surface gap 2n of a pair of side surfaces 2b at both ends in the major axis direction of the horizontal cross-section in the overhanging punch 2, but a side surface gap 4m of a pair of side surfaces 4a at both ends in the minor axis direction in the perforating punch 4 is set to be smaller than the side surface gap 2m of a pair of side surfaces 2a in the minor axis direction in the overhanging punch 2.

Therefore, as in FIG. 2(B1), width 3n in the major axis direction of the hole portion 5 is substantially identical to the width in the major axis direction of the overhang portion 3, but the width in the minor axis direction of the hole portion 5 is, as in FIG. 2(B2), smaller than the width in the minor axis direction of the overhang portion 3. As a result, at the apical portion of the side surface 4a in the minor axis direction of the overhang portion 3, there remains an overhang zone 3b (FIG. 2(B2)) that is elongated and has an arc cross-section curved toward the inside of the minor axis direction. Meanwhile, in FIGS. 2(B1) and 2(B2), there is shown for reference the shape of a side cross-section of a metal piece 6 cut off when the hole portion 5 has been perforated. The shape of the overhang portion 3 with the hole portion 5 formed in the second step through the first step is shown in FIG. 1(B).

In FIGS. 2(C1) and 2(C2) of the third step, a state, where the burring punch 7 is pressed in the pressing direction F shown by an arrow onto the peripheral edge portion of the hole portion 5 formed in the second step and the portion is pulled up to form the burring 8 on the peripheral edge portion, is shown. The burring punch 7 has a pair of side surfaces 7b at both ends in the major axis direction and a pair of side surfaces 7a at both ends in the minor axis direction, which are made of a hard metal for press, extend parallel in the pressing direction F and are parallel to each other.

The difference 7n−2n between the side surface gap 7n of a pair of side surfaces 7b at both ends in the major axis direction of a flat ellipsoid in a horizontal cross-section orthogonal to the pressing direction F in the burring punch 7 and the side surface gap 2n of a pair of side surfaces 2b at both ends in the major axis direction of a flat ellipsoid in the horizontal cross-section of the overhanging punch 2 in the first step is set to be smaller than the difference 7m−2m between the side surface gap 7m of a pair of side surfaces 7a at both ends in the minor axis direction of the burring punch 7 and the side surface gap 2m of a pair of side surfaces 2a at both ends in the minor axis direction of the horizontal cross-section of the overhanging punch 2 (7n−2n<7m−2m).

As a consequence of this setting, upon burring machining, at rim portions of the hole portion 5 at both ends in the major axis direction with small gap difference, a low major axis direction burring 8b is formed while expanding smaller, and at rim portions of the hole portion 5 in the minor axis direction with large gap difference, a high minor axis direction burring 8a is formed while expanding more largely.

On the other hand, in the second step of the embodiment, it is machined so that a rectilinear remaining portion 3c is formed at apical portions of side surfaces at both ends in the major axis direction of the horizontal cross-section of the overhang portion 3 as described above, and that the overhang zone 3b that is elongated and has an arc cross-section curved toward the inside of the minor axis direction of the overhang portion 3 remains (see FIG. 2(B2)). Upon burring machining, this arc overhang zone 3b is pulled up with plastic deformation in the vertical direction by pressing force of the burring punch 7, and therefore burring can be formed by furthermore low pressing force as compared with a case where it is vertical from the beginning.

As the synergistic result of above-described plurality of effects, upon burring machining, at both ends in the major axis direction of the horizontal cross-section, the burring 8b in the major axis direction is low, and therefore stress generated in that is reduced and occurrence of a crack phenomenon in a part of the portion is surely avoided.

By the third step, as the burring 8, a low burring 8b in the major axis direction and a high burring 8a in the minor axis direction are formed on the peripheral edge portion of a flat hole 9, and in FIG. 1(C) the flat hole 9 with the burring 8 machined in this way is shown.

Figure 3:
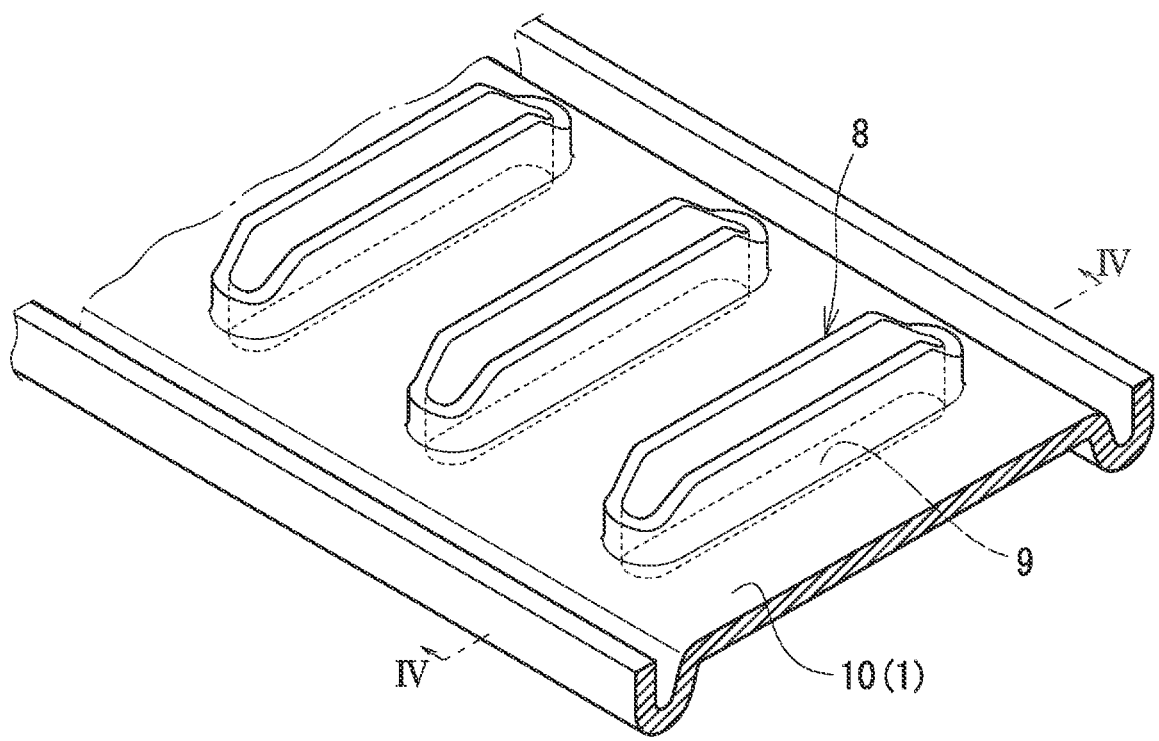
FIG. 3 illustrates a partial perspective view of a header plate in which a burred flat hole is formed by the machining method in FIG. 2.
Figure 4:
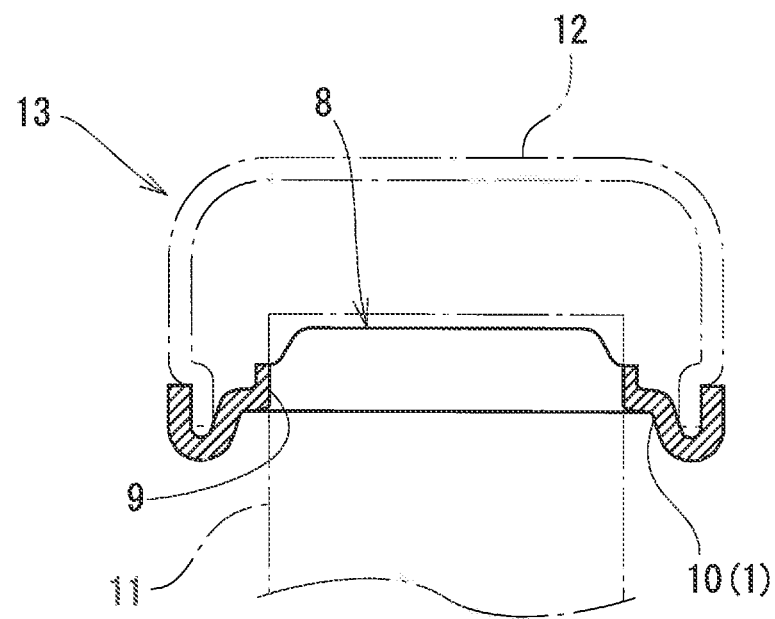
FIG. 4 illustrates a cross-section view along IV-IV in FIG. 3.

FIG. 3 illustrates a partial perspective view of a header plate in which a burred flat hole is formed by the machining method in FIG. 2, and FIG. 4 illustrates a cross-section view along IV-IV in FIG. 3. In a header plate 10 that is the metal plate 1, plural flat holes 9 with the burring 8 are formed in parallel to each other, and each of flat holes 9 and an end portion, inserted therein, of a flat tube 11 shown with a flat tube 11 in FIG. 4 are brazed and fixed each other in the state.

The contact area between the outer circumference surface of the flat tube 11 and the inner circumference surface of the flat hole 9 is increased by the burring 8, and therefore fixing strength of the brazing can be maintained sufficiently. Meanwhile, in FIG. 4, a tank main body 12 shown with a dashed one-dotted line is fixed to both of the curved rim portions in the header plate 10 to form a tank 13 on an inlet side or an outlet side of fluid.

Note that fins (not illustrated) are arranged between a plurality of flat tubes 11 stacked with each other, and a core portion is formed with these plurality of flat tubes 11 and fins.

Moreover, in the above example, the plane of the header plate 10 is formed flatly, but it may be formed so as to have an arc cross-section. In this case, a burring portion is formed along the arc, and burring portions at both ends in the major axis direction is formed lower than that in the minor axis direction.

Figure 5:
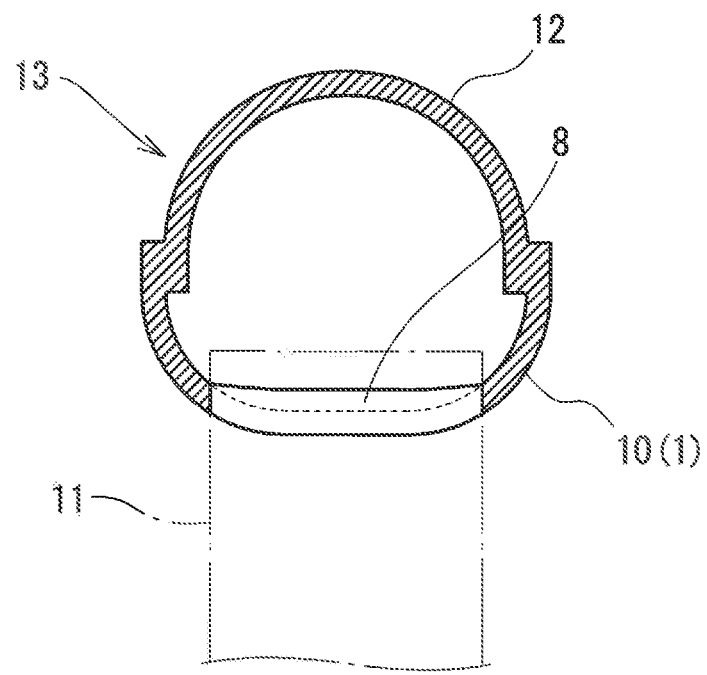
FIG. 5 illustrates a horizontal cross-section view in a second Example of the present invention, seen from the same direction as in FIG. 4.
Figure 6:
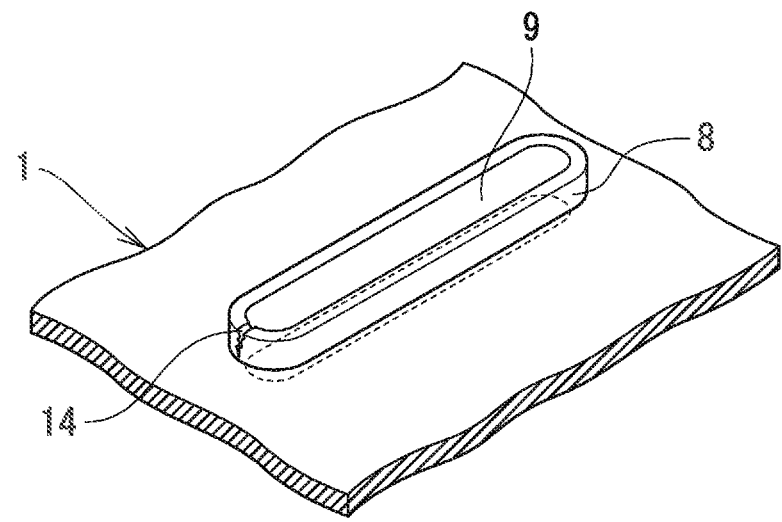
FIG. 6 illustrates an explanation view of a conventional type burring-machined portion.

In FIG. 5, a schematic view of the horizontal cross-section is shown. In the example, the horizontal cross-section of the header plate 10 is formed in an arc shape. To the header plate 10, the tank main body 12 having an arc horizontal cross-section is fixed to form the tank 13, and the core portion is formed with a stacked plurality of flat tubes 11 and fins (not illustrated) arranged therebetween. Further, in the header plate 10 having an arc cross-section, the burring 8 is formed. The height of the burring 8 is low at both ends in the major axis direction of an ellipsoidal hole, and is high at the center in the major axis direction thereof. The burring 8 like this may be formed by forming the burring punch 7 so as to have a shape in which a plan cross-section is flat and an outer circumference of a longitudinal cross-section in the major axis direction is formed in an arc, and setting the cross-section at the center in the major axis direction of the burring punch 7 to be higher than both ends in the major axis direction. Then, a heat exchanger is configured by these respective members.

INDUSTRIAL APPLICABILITY

A machining method for a burred flat hole in metal plates of the present invention can be utilized for burring machining metal plates such as a header plate for a heat exchanger in vehicles and the like.

REFERENCE SIGNS LIST 1 metal plate
2 overhanging punch
2a side surface
2b side surface
2c bottom surface
2n side surface gap
2m side surface gap
3 overhang portion
3a bottom surface
3b overhang zone
3c remaining portion
3n width
4 perforating punch
4a side surface
4b side surface
4n side surface gap
4m side surface gap
5 hole portion
6 metal piece
7 burring punch
7a side surface
7b side surface
7n side surface gap
7m side surface gap
8 burring
8a minor axis direction burring
8b major axis direction burring
9 flat hole
10 header plate
11 flat tube
12 tank main body
13 tank
14 crack portion
F pressing direction

The invention claimed is:

1. A machining method for a burred flat hole in a metal plate, comprising:
a first step of pressing an overhanging punch having a flat cross-section orthogonal to a pressing direction onto a surface of a metal plate to form an overhang portion that is flat in the cross-section;
a second step of pressing a perforating punch having a flat cross-section orthogonal to the pressing direction onto a bottom surface of the formed overhang portion to form a planar flat hole portion in the portion; and
a third step of pressing a burring punch onto a peripheral edge portion of the formed hole portion to form a burring by pulling up the portion,
wherein:
each of the overhanging punch and the perforating punch has a pair of side surfaces that are parallel to the pressing direction and are positioned at both ends in a longitudinal direction (hereinafter, referred to as a "major axis direction") of the cross-section and a pair of side surfaces that are positioned at both ends in a width direction (hereinafter, referred to as a "minor axis direction") of the cross-section; and
difference (7n−2n) between the side surface gap 7n at both ends in the major axis direction of the cross-section of the burring punch and the side surface gap 2n at both ends in the major axis direction of the cross-section of the overhanging punch is set to be smaller than difference (7m−2m) between the side surface gap 7m at both ends in the minor axis direction of the cross-section of the burring punch and the side surface gap 2m in the minor axis direction of the cross-section of the overhanging punch, that is, (7n−2n)<(7m−2m).

2. The machining method for a burred flat hole in a metal plate according to claim 1, wherein the metal plate is a header plate for a heat exchanger.

* * * * *